Dec. 2, 1924.

R. EVANS

TYPE MATRIX

Filed July 16, 1923

1,517,970

Richard Evans
INVENTOR

BY Victor J. Evans
ATTORNEY

Patented Dec. 2, 1924.

1,517,970

UNITED STATES PATENT OFFICE.

RICHARD EVANS, OF HIGHLAND PARK, ILLINOIS.

TYPE MATRIX.

Application filed July 16, 1923. Serial No. 651,902.

*To all whom it may concern:*

Be it known that I, RICHARD EVANS, a citizen of the United States, residing at Highland Park, in the county of Lake and State of Illinois, have invented new and useful Improvements in Type Matrices, of which the following is a specification.

This invention relates to matrices particularly designed for use in the making of rubber type or stamps, and an object of the invention is to provide matrices which will materially reduce the amount of work contingent with the making of rubber type or stamps and which will consequently reduce the cost of manufacture of such article.

Heretofore, it has been the practice, in the making of rubber type or rubber stamps to assemble the printer's type, and lock the assembled type in a chase from which a mold of a suitable compound is made. After the mold is formed it must be allowed to harden and dry before the rubber type or stamp can be vulcanized therefrom and after the mold is properly hardened a sheet of unvulcanized rubber is placed on the mold and the mold is placed in a vulcanizer which is heated to the proper temperature, and pressure applied which forces the rubber into the mold. In a specified time the rubber will become vulcanized after which it is removed from the mold with the result that the rubber will be a facsimile of the type originally used in forming the mold.

An object of the present invention is to provide type matrices for forming the rubber type or stamps which will eliminate the making of the mold, which mold is relatively expensive in that it requires a skilled artisan to make it, besides requiring the cost of the composition and the delay necessary for allowing the mold to dry.

Other objects of the invention will appear in the following detailed description taken in connection with the accompanying drawings wherein:—

Figure 1:
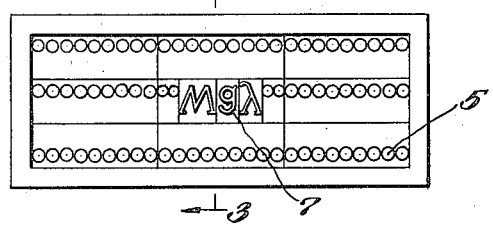
Fig. 1 is a plan view of one side of a form of type matrices.
Figure 2:
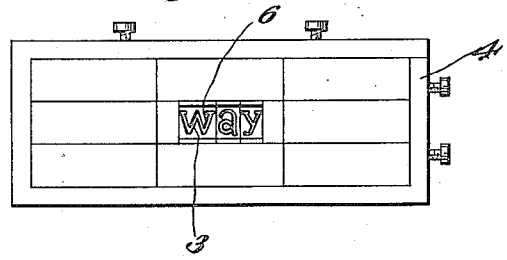
Fig. 2 is a face view of the other side of the form of assembled type matrices.

Referring more particularly to the drawings, a novel form of type is employed in the present invention, in which the type body 1 has an embossed or raised letter or character 2, upon one end and an engraved or sunk letter or character 3, upon the opposite end which engraved letters, when assembled in word formation, as shown in Fig. 2 of the drawings and properly clamped in a chase 4, of any approved construction, form the matrix or mold from which the rubber type or rubber stamp is made. The embossed letter 2 is provided to facilitate the setting of the type matrices, and to permit the taking of proofs from them for the detection and correction of mistakes after the type has been set. The spaces, quads, leads and slugs together with the type matrices must be of equal height. However, the spaces, quads, leads and slugs being type high preferably have dots as shown at 5 thereon, so that a proof can be taken of the form without the ends of the quads, spaces, leads and slugs showing up solid which would make a very unsatisfactory print or proof, such solid impression being eliminated by the dots 5. After the type is properly assembled, the side opposite that on which the embossed letters, 2, are formed will carry a matrix or depressed representation, 6, of the words, characters, or the like, 7, formed by the letters 2 and it is from this matrix that the rubber type or stamp is made. In making the rubber stamp or type, a sheet of unvulcanized rubber is placed directly on the side of the assembled type matrices on which the engraved letters 3 are formed, and it is then vulcanized and withdrawn in the usual manner, which provides a rubber stamp without requiring the use of the type of molds now commonly employed in the making of rubber stamps and it also provides that all of the letters in the stamp will always be perfect, owing to the fact that the liability of distorting or disrupting the letters when the mold is soft is eliminated.

Figure 3:
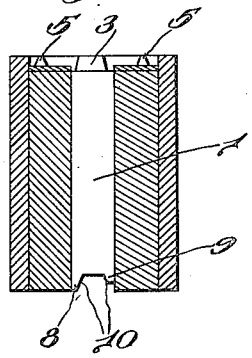
Fig. 3 is a vertical section taken on the line 3—3 of Fig. 1.
Figure 4:
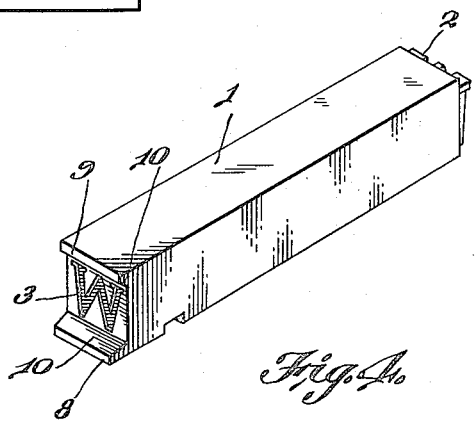
Fig. 4 is a perspective view of one bar of type constructed in accordance with this invention.

By particular reference to Figs. 3 and 4 of the drawings it will be noted that the edge portion 8 of the type matrix 1 at one side of the engraved letter 3 is longer than the corresponding edge portion 9 at the opposite side of the letter this is provided to permit proper assembly of the various type slugs in the mold, to give depth to the mold and provide sufficient body for the rubber stamp. The inner surfaces 10 of the edge portions 8 and 9 are inclined, as clearly shown in Figs. 3 and 4 of the drawings gradually inclining outwardly towards their outer ends so as to permit the formed rubber type or stamp to be readily removed.

It is, of course, to be understood that the invention may be constructed in other manners and the parts associated in different relations and, therefore, I do not desire to be limited in any manner except as set forth in the claims hereunto appended.

Having thus described my invention what I claim is:—

1. As a new article of manufacture, a type bar having a character embossed on one end and the same character engraved in the opposite end, said bar having edge portions extended along two sides at the engraved end, one of said extensions being longer than the other.

2. As a new article of manufacture, a type bar having a character embossed on one end and the same character engraved in the opposite end, said bar having edge portions extended along two sides at the engraved end, said extensions having their inner surfaces inclining outwardly.

3. As a new article of manufacture, a type bar having a character embossed on one end and the same character engraved in the opposite end, said bar having edge portions extended along two sides at the engraved end, one of said extensions being longer than the other, said extensions having their inner surfaces inclining outwardly.

4. A matrix for forming rubber type or stamps comprising a plurality of type matrices having embossed characters on one end and the same characters engraved in their opposite ends, and a plurality of spacing media having flat end surfaces at the engraved end of the character bars, and period forming points upon their opposite ends.

5. A matrix for forming rubber type or stamps comprising a plurality of type matrices having embossed characters on one end and the same characters engraved in their opposite ends, a plurality of spacing type media having flat end surfaces at the engraved end of the character bars, and period forming points upon their opposite ends, the character carrying bars having their engraved ends cut away forming extensions at opposite sides one of which extensions lies flush with the flat surfaces of the spacing media while the other extension has its outer end located inwardly of the flat end surfaces of the spacing media.

6. A matrix for forming rubber type or stamps comprising a plurality of type matrices having embossed characters on one end and the same characters engraved in their opposite ends, a plurality of spacing type media having flat end surfaces at the engraved end of the character bars, and period forming points upon their opposite ends, the character carrying bars having their engraved ends cut away forming extensions at opposite sides one of which extensions lies flush with the flat surfaces of the spacing media while the other extension has its outer end located inwardly of the flat end surfaces of the spacing media, said extensions having their inner sides inclined.

7. As a new article of manufacture, a type bar having a character engraved in one end thereof, said bar having edge portions extended along two sides of said engraved end, and one of said extensions being longer than the other.

8. As a new article of manufacture, a type bar having a character engraved in one end thereof, said bar having edge portions extended along two sides of said engraved end, and one of said extensions being longer than the other, said extensions having their inner surfaces inclining inwardly.

In testimony whereof I affix my signature.

RICHARD EVANS.